United States Patent [19]

Sevenich

[11] Patent Number: 5,458,909
[45] Date of Patent: Oct. 17, 1995

[54] PREPARATION OF PROCESS FOOD USING LIQUID SODIUM PHOSPHATE

[75] Inventor: John R. Sevenich, Mendota Heights, Minn.

[73] Assignee: Hawkins Chemcial, Inc., Minneapolis, Minn.

[21] Appl. No.: 318,215

[22] Filed: Oct. 5, 1994

Related U.S. Application Data

[63] Continuation-in-part of Ser. No. 148,390, Nov. 8, 1993.

[51] Int. Cl.⁶ ................................................ A23G 19/082
[52] U.S. Cl. .......................... 426/582; 426/332; 426/618
[58] Field of Search ............................... 426/582, 332, 426/618

[56] References Cited

U.S. PATENT DOCUMENTS

| | | | |
|---|---|---|---|
| 3,615,586 | 10/1971 | Rohlfs et al. | 426/582 |
| 3,635,733 | 1/1972 | Kichline | 426/582 |
| 3,729,546 | 4/1973 | Bell | 423/306 |
| 4,609,553 | 9/1986 | Zboralski et al. | 426/36 |
| 5,061,503 | 10/1991 | Kong-Chan et al. | 426/582 |
| 5,061,504 | 10/1991 | Kong-Chan et al. | 426/582 |
| 5,069,922 | 12/1991 | Brotsky et al. | 426/332 |
| 5,143,739 | 9/1992 | Bender et al. | 426/332 |
| 5,173,321 | 12/1992 | Hosgoe et al. | 426/573 |
| 5,192,570 | 3/1993 | Bender et al. | 426/332 |
| 5,262,186 | 11/1993 | Bender et al. | 426/332 |
| 5,268,185 | 12/1993 | Bender et al. | 426/92 |
| 5,283,073 | 2/1994 | Bender et al. | 426/332 |
| 5,301,387 | 4/1994 | Hine | 426/582 |
| 5,304,387 | 4/1994 | Hine | 426/582 |

FOREIGN PATENT DOCUMENTS

| | | |
|---|---|---|
| 1299989 | 7/1969 | Germany . |
| 2342299 | 4/1975 | Germany . |
| 1692305 | 7/1991 | Germany . |

OTHER PUBLICATIONS

Jen et al, *Factors Influencing the Curd Tension of Rennet Coagulate Milk. Salt Balance*, Journal of Dairy Science, vol. 53, No. 9, pp. 1201–1206.

Thomas et al, *Effect of Emulsifying Salts on Objective and Subjective Properties of Processed Cheese*, Journal of Food Science, vol. 45, 1980, pp. 458–460.

Greenwood et al., *Chemistry of the Elements*, Pergamon Press, pp. 598–599 and pp. 603–604.

Chandra, *Coagulation of Milk by Tribasic Acids and Their Salts*, Indian Journal of Dairy Science, 1970, pp. 65–66.

Caric et al., *Effects of of Emulsifying Agents of the Microstructure and Other Characteristics of Process Chees—A review*, Food Microstructure, vol. 4, 1985, pp. 297–312.

Toy, Arthur D. F. *Phosphorous Chemistry in Everyday Living*, A.C.S., Washington, D.C. 1976.

Molins, *Phosphates in Food*, CRC Press Inc. 1991 p. 57.

Primary Examiner—Jeanette Hunter
Assistant Examiner—Lien Tran
Attorney, Agent, or Firm—Merchant, Gould, Smith, Edell, Welter & Schmidt

[57] ABSTRACT

Sodium phosphate emulsifying agents can be prepared by contacting a liquid sodium phosphate with an effective amount of a source of alkalinity to give a liquid phosphate composition with a predetermined ratio of disodium phosphate and trisodium phosphate emulsifying agents. The liquid phosphate composition can then be combined with a food product precursor to produce a processed food product.

6 Claims, 3 Drawing Sheets

5,458,909

PREPARATION OF PROCESS FOOD USING LIQUID SODIUM PHOSPHATE

CROSS-REFERENCE TO RELATED APPLICATION

This application is a continuation-in-part of U.S. application Ser. No. 08/148,390, of Nov. 8, 1993, now allowed.

FIELD OF THE INVENTION

The invention is related to the preparation of processed food products, for example, dairy, meat or cereal products, specifically, cheese using liquid sodium phosphates as emulsifying agents.

BACKGROUND OF THE INVENTION

It is well known that phosphates and their salts are useful as emulsifying agents in the preparation of food products, for example, dairy products including process cheese. The preparation and properties of such emulsifying agents are well known. (See, U.S. Pat. Nos. 3,729,546 (Bell); 3,615,586 (Rohlfs) and German Patent Nos. 1,299,989, 1,692,305 and 2,342,299).

Sodium phosphates are commonly used in the manufacture of process cheese either alone or in mixtures. The sodium phosphates sequester calcium ions in the cheese, to solubilize the protein and increase its hydration and swelling, to facilitate emulsification of fat, and to adjust and stabilize pH. (See, Caric et al., *Food Microstructure*, Vol. 4, pp. 297 (1985). Sodium phosphates are of great importance to cheese processing because they affect the chemical, physical and microbiological properties of the finished cheese product. Sodium phosphates are not emulsifiers in the strict sense, i.e. they are not surface-active substances, yet they are commonly included in the group of ingredients called "emulsifying agents" (See Caric et al., *Food Microstructure*, Vol. 4, pgs. 297–312 (1985).

Process cheese is prepared by heating hard cheese and/or soft cheese in a mixture with certain emulsifying agents in a melting process to a temperature above about 80° C. During this melting process, the insoluble starting cheeses are converted into liquid by means of the emulsifying agents. (See U.S. Pat. No. 3,615,586).

The known processes to prepare process cheese typically involve the addition of the sodium phosphate emulsifying agents as dry-solids or as a combination of concentrated solutions of disodium phosphate and trisodium phosphate from separate heated storage tanks. Problems are associated with these processes, however. Adding solid sources of sodium phosphates can result in a phosphate build up within a cooker or blender because the solid phosphates do not fully dissolve and stick to the augers. The build-up of phosphates on the inside of the cooker or blender causes the cheese to burn during the cooking cycle. Undissolved phosphates also give the processed cheese a lumpy consistency. Furthermore, when a solid source of sodium phosphate does not fully dissolve in the process mixture, the residual undissolved solid sodium phosphate contributes to the solids that are removed by filters.

Alternatively, if concentrated liquid sources of disodium phosphate and trisodium phosphate are utilized in the cheese manufacturing process, these solutions must be stored at elevated temperatures (130° to 160° F.) to prevent crystallization of the sodium phosphates from solution. Storing the concentrated disodium phosphate and trisodium phosphate solutions at elevated temperatures requires expensive insulating and heating equipment which increases manufacturing costs significantly. Furthermore, if a malfunction allows the temperature to drop, the solutions can crystallize within the delivery system, resulting in expensive downtime, repairs and/or replacement of the tanks, pumps, valves and piping.

Further, the manufacture of dry disodium phosphate, can result in pyrophosphate formation resulting from two disodium phosphate molecules fusing together. This is caused by high temperatures (approximately 450° C.) in the drying process. Pyrophosphate contamination in the process cheese will result in the failure of starting cheeses to completely homogenize. (See, Molins, *Phosphates in Food*, CRC Press Inc. (1991) pg. 57). As much as 0.5% tetrasodium pyrophosphate in the disodium phosphate is detrimental to its use in process cheese. Toy, Arthur D. F., Phosphorus Chemistry in Everyday Living, A.C.S., Washington, D.C., 1976. The processed cheese would lose its melting properties.

The addition of dry solid sources of disodium phosphate and trisodium phosphate requires human labor to physically add the appropriate amount of the disodium phosphate and/or trisodium phosphate. This results in substantial bag disposal cost, phosphorous additions to landfills, and occasionally, human error in measuring the amount of phosphate to be added. Injuries from lifting heavy bags are also a concern for employees and employers.

For these reasons, the preparation of process cheese using a dry solid source of sodium phosphates or by adding separate amounts of concentrated disodium phosphate or trisodium phosphate solutions stored at elevated temperatures is an expensive process. The use of the solid has the same disadvantages as mentioned above for processing cheese. Also, the use of liquid trisodium phosphate would require heated storage and steam traced piping.

Trisodium phosphate is also used in other food processing industries such as meats, fish and poultry for reducing, removing, retarding or controlling salmonella and other spoilage bacteria. (See U.S. Pat. Nos. 5,192,570; 5,143,739; 5,069,922; 5,262,186; 5,268,185; and 5,283,073). Thus, it is an object of this invention to prepare food products by a more economic and quality concerned route.

SUMMARY OF THE INVENTION

The invention is directed to a method for the preparation of food products, specifically, process cheese, poultry or cereal. The method involves contacting a liquid sodium phosphate with an effective amount of a source of alkalinity to give a liquid phosphate composition with a predetermined ratio of monosodium phosphate, disodium phosphate and trisodium phosphate, and combining a food product precursor with the liquid phosphate composition. In one embodiment, the invention is directed to an improved method of preparing process cheese, comprising the steps of contacting a liquid sodium phosphate with an effective amount of sodium hydroxide to give a liquid phosphate composition with a predetermined ratio of monosodium phosphate, disodium phosphate, and trisodium phosphate, (i.e. predetermined pH) and combining a process cheese precursor with the liquid phosphate composition.

In a preferred embodiment, the invention is directed to an improved method of preparing process cheese comprising the steps of contacting a liquid sodium phosphate with an effective amount of sodium hydroxide to give a liquid phosphate composition with a predetermined ratio of monosodium phosphate, disodium phosphate and trisodium phosphate, and combining a process cheese precursor with the liquid phosphate composition wherein the liquid sodium phosphate is stored at a temperature between about 40° to 110° F., has a crystallization temperature less than about 115° F., has an acidic pH less than about 6.5 and has a greater concentration of monosodium phosphate than disodium phosphate.

In a further aspect of the invention, dairy, meat and cereal products are prepared according to the method of the invention. Specifically, a process cheese, poultry, or cereal product is prepared according to the method of the invention.

Thus, for example, another aspect of the invention is a method of using liquid trisodium phosphate to reduce, remove, retard or control salmonella and other spoilage bacteria, e.g. campylobacter and listeria, in processing poultry comprising the steps of: (a) contacting a liquid sodium phosphate with an effective amount of sodium hydroxide to give a liquid trisodium phosphate composition, and (b) combining a poultry product precursor with the liquid trisodium phosphate composition; wherein the liquid sodium phosphate is stored at a temperature between about 40° to 100° F., has a crystallization temperature less than about 115° F., has an acidic pH less than about 6.5, and has a greater concentration of monosodium phosphate than disodium phosphate. Still another aspect of the invention is a method of using liquid trisodium phosphate as above in cereal production and in other food products such as meats, red meats or fish.

Due to the problems and expense that exists with the known methods of adding sodium phosphates to food products, a substantial need exists for a method of adding sodium phosphates to food products which utilizes a liquid sodium phosphate starting material, that can be stored at room temperature, and that can provide predetermined variable amounts of monosodium phosphate, disodium phosphate and trisodium phosphate in the final food product. The method of the invention does not require high temperature storage of the liquid sodium phosphate starting material, and reduces the labor costs associated with dry solid sodium phosphate bag disposal and manual addition of the dry solid sodium phosphate to the food product precursor. Room temperature storage also allows the use of inexpensive poly tanks and normal uninsulated piping for delivery. Further, the invention substantially reduces the frequency of filter changes associated with the removal of undissolved solid sodium phosphates in the manufacturing process.

The method of the invention can also result in faster cook times for the food product because the reaction between the liquid sodium phosphate and the source of alkalinity is highly exothermic and can produce enough heat to contribute energy to the processing temperature. In addition, "dwell times" associated with dissolving the dry sodium phosphate in the process liquid can be greatly reduced or eliminated from the process. In dairy products, creamier textures are observed because of the elimination of unsolubilized dry phosphates.

The method of the invention can eliminate the possibility of pyrophosphate contamination of the dairy product which results from contaminated dry disodium phosphate. The invention does not use dry disodium phosphate, which can fuse in the drying process during the manufacturing process forming pyrophosphates, and therefore, eliminates the starting material which causes the pyrophosphate contamination in the dairy product.

The method of the invention can also be automated which reduces human error, labor and processing times.

DETAILED DESCRIPTION OF THE INVENTION

Figure 1:
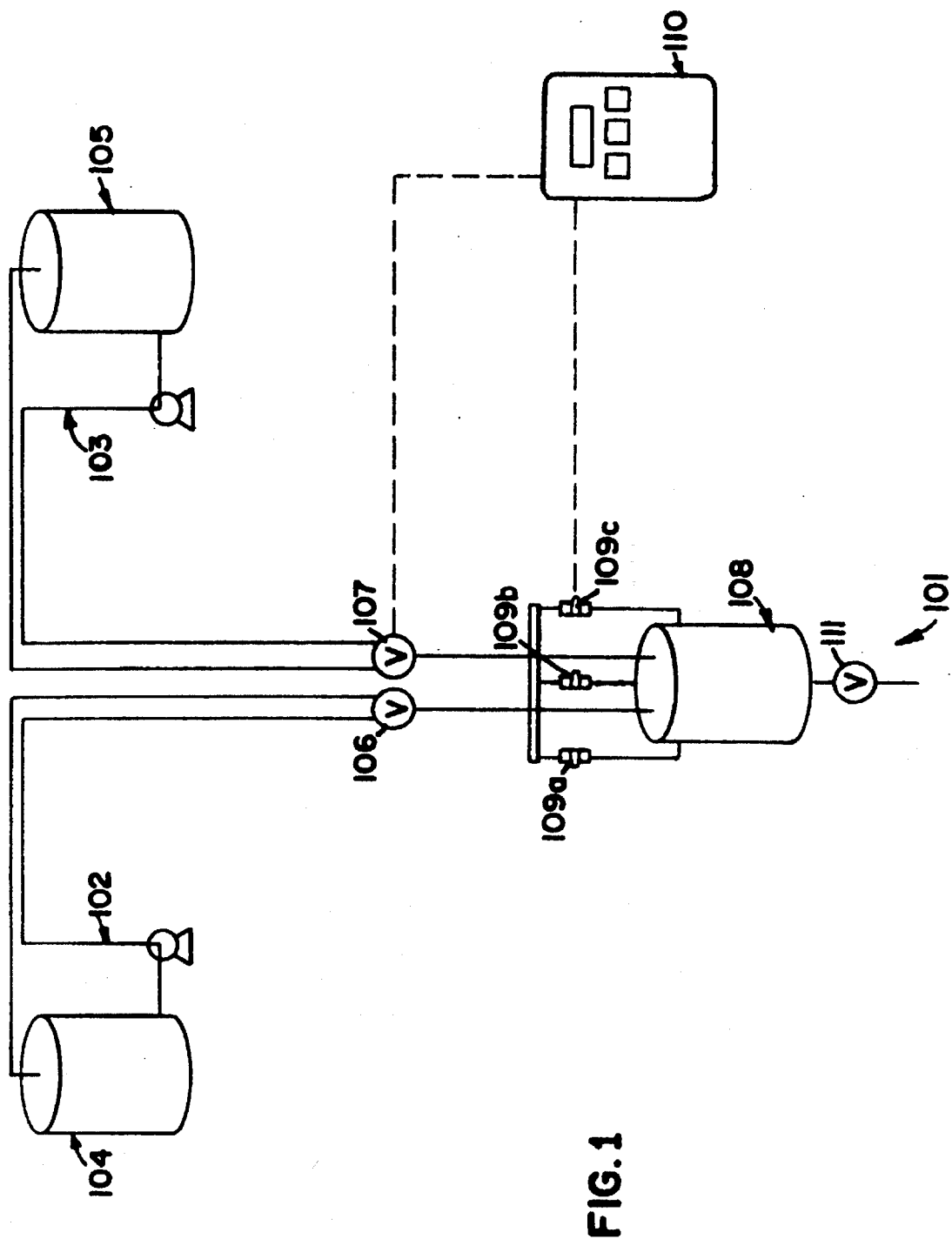
FIG. 1 is a schematic drawing of a batch-type manufacturing process that can be used to practice the method of the invention.

The invention is directed to the discovery that sodium phosphate emulsifying agents can be added during the manufacture of a food product using a novel process to produce and then deliver the sodium phosphates. Specifically, the invention involves contacting a liquid sodium phosphate with an effective amount of a source of alkalinity to give a liquid phosphate composition with a predetermined ratio of monosodium phosphate, disodium phosphate, and trisodium phosphate, and combining a food product precursor with the liquid phosphate composition.

The invention can be utilized in any food product manufacturing process which utilizes sodium orthophosphates. Generally, sodium orthophosphates are used as emulsifying agents in dairy and poultry products, but the invention should not be limited to such use as emulsifying agents.

Dairy products which can be prepared using the invention include but should not be limited to: cheese, milk, cream, butter and dairy dessert compositions. Preferably, the dairy product comprises a process cheese. Typical ingredients used in the manufacture of process cheese include but should not be limited to: a natural cheese base, emulsifying agents, milk protein ingredients, cream, butter, preservatives, coloring agents, flavoring agents, water, salt, vegetables, spices, and binders.

In the context of this invention, the terms "food product precursor," "meat and poultry product precursor," "cereal product precursor," "dairy product precursor" or "process cheese precursor" include all of the ingredients in the final food product except the sodium phosphate. Thus, the addition of the sodium phosphate to the food product precursor or, in particular, the process cheese precursor would result in a complete food product formulation or, in particular, a complete process cheese formulation.

Examples of process cheese include but should not be limited to: dry cheese such as that on CHEETOS®, sliced cheese, cheese dip, cheese sauce, and soft cheese such as VELVEETA®.

The principles of process cheese production are well known and typically involve adding the emulsifying agents (sodium phosphates) in either a blending stage where the natural cheese is ground up, or in a cooking stage where the ground natural cheese composition is heated by steam in an auger to produce a homogeneous liquid blend. The process cheese production can be either a batch or continuous system, and the method of the invention can be used in either a batch or continuous process.

Sodium phosphates are known emulsifying agents. Emulsifying agents are used in dairy products to sequester calcium in the protein system of the dairy product; peptize, solubilize and disperse protein; hydrate and swell proteins; emulsify fat and stabilize the emulsions; control and stabilize the pH; and form an appropriate dairy product structure after cooling. (See, Caric, et al., *Effects of Emulsifying Agents on the Microstructure and Other Characteristics of Process Cheese, Food Microstructure*, Vol. 4, pgs. 297–298 (1985)).

Importantly, if too much emulsifying agent is added to the process cheese, the cheese will not melt during processing and a hard brick of cheese will form. In contrast, if too little emulsifying agent is added, the cheese will oil off and will not homogenize. Furthermore, by U.S. Government regulations, no more than 3% by weight of the final dairy product can comprise phosphates.

The invention involves manufacturing and then dispensing the sodium phosphate emulsifying agents as a liquid phosphate composition. Specifically, an effective amount of a source of alkalinity is added to a liquid sodium phosphate to give a liquid phosphate composition with a predetermined ratio of monosodium phosphate, disodium phosphate, and trisodium phosphate. The desired ratio of monosodium phosphate, disodium phosphate and trisodium phosphate in the final cheese product is determined based on a variety of the factors including pH, desired organoleptic properties, type of cheese, and buffering capacity among other things.

In the manufacture of a meat, poultry or cereal product, the effective amount of a source of alkalinity is added to liquid sodium phosphate to give a liquid composition of trisodium phosphate. In the meat or poultry product, the liquid trisodium phosphate prevents, reduces or eliminates salmonella.

In the cereal product, the pH of the cereal mix can be controlled by varying the amount of alkalinity source added in the liquid sodium phosphate as desired.

The liquid sodium phosphate is an aqueous solution comprising monosodium phosphate. The liquid sodium phosphate can be stored in a storage tank at a temperature between about 40° F. and 110° F.

Preferably, the liquid sodium phosphate has a crystallization temperature of below about 115° F. More preferably, the liquid sodium phosphate crystallizes at a temperature of below about 100° F., most preferably at a temperature below about 90° F. Thus, the liquid sodium phosphate is a homogenous solution during room temperature storage, and does not require insulated tanks and pipes to keep the sodium phosphates in solution from crystallizing.

The pH of the liquid sodium phosphate correlates to the ratio of monosodium phosphate, disodium phosphate and trisodium phosphate in solution. Greater amounts of monosodium phosphate are present in acidic solutions compared to greater amounts of trisodium phosphate being present in alkaline solutions. Preferably, the liquid sodium phosphate comprises a greater concentration of monosodium phosphate than disodium phosphate. Preferably, pH of the liquid sodium phosphate is an acidic pH below about 6.5. More preferably, the pH of the liquid sodium phosphate is below about 5.5, most preferably below about 4.3

The percent by weight of sodium phosphate in the liquid sodium phosphate is generally between about 5 to 95%. More preferably, there is about 15 to 70% by weight of the sodium phosphates in the liquid sodium phosphate, most preferably 25 to 60% by weight.

The source of alkalinity (or base) can be any one of a variety of food grade bases. Preferably, the source of alkalinity is an alkali metal salt. Both sodium and potassium salts can be utilized in the invention, but sodium salts are preferred because potassium salts tend to give a metallic taste to the food product. More preferably, the source of alkalinity comprises sodium hydroxide, sodium carbonate, or mixtures thereof. Because a more concentrated solution of sodium hydroxide can be prepared (up to about 50% by weight), the preferred source of alkalinity comprises sodium hydroxide.

The maximum concentration of a sodium hydroxide solution that can be prepared at room temperature is about 50% by weight. However, if heating is employed, a solution of up to about 70% by weight sodium hydroxide can be prepared. The weight percentage of the solids in the source of alkalinity is preferably about 5 to 70%. More preferably, the percent by weight of solids in the source of alkalinity is about 5 to 50%, most preferably 30 to 50%.

In a preferred embodiment of the invention, the source of alkalinity is added to the liquid sodium phosphate. When the source of alkalinity is added to the liquid sodium phosphate, a liquid phosphate composition is produced in an exothermic, autocatalytic reaction to give a specific ratio of monosodium phosphate, disodium phosphate and trisodium phosphate in solution. The temperature of the liquid phosphate composition can rise to about 180° F. from the energy released in the exothermic reaction between the liquid sodium phosphate and the source of alkalinity. This increase in temperature can be advantageously used in the manufacture of a dairy product, specifically, in the production of process cheese to facilitate the melting of the natural cheese.

After the source of alkalinity has contacted the liquid sodium phosphate to form the liquid phosphate composition, the liquid phosphate composition can be added to the process cheese precursor and no dwell (mixing) time is required. Dry sodium phosphates conversely are usually added after ½ of the process cheese precursor is put in the cooker to insure adequate mixing. In a typical batch type manufacturing process, the liquid sodium phosphate and the source of alkalinity are allowed to mix for about 15 seconds before they are combined with the process cheese precursor. In a typical continuous system the liquid sodium phosphate and the source of alkalinity are separately added to the process cheese precursor simultaneously.

In a preferred embodiment of the invention 101 shown in FIG. 1, the sodium hydroxide and the liquid sodium phosphate materials are pumped in continuous loops 102 and 103 from the liquid sodium hydroxide and liquid sodium phosphate storage tanks 104 and 105 to three way valves 106 and 107. The valves are adjacent to a small stainless steel (or other heat resistant material) batch tank 108 which is connected to load cells 109a–c. The liquid sodium phosphate is delivered first into the batch tank 108 via a preprogrammed controller 110 or manually via a weight scale (not shown in FIG. 1). The liquid sodium hydroxide is then added in the same manner. A third valve 111 can then be opened, adding the liquid phosphate composition into, for example, a cheese cooker or cheese blender (not shown in FIG. 1) to be combined with the process cheese precursor.

Figure 2:
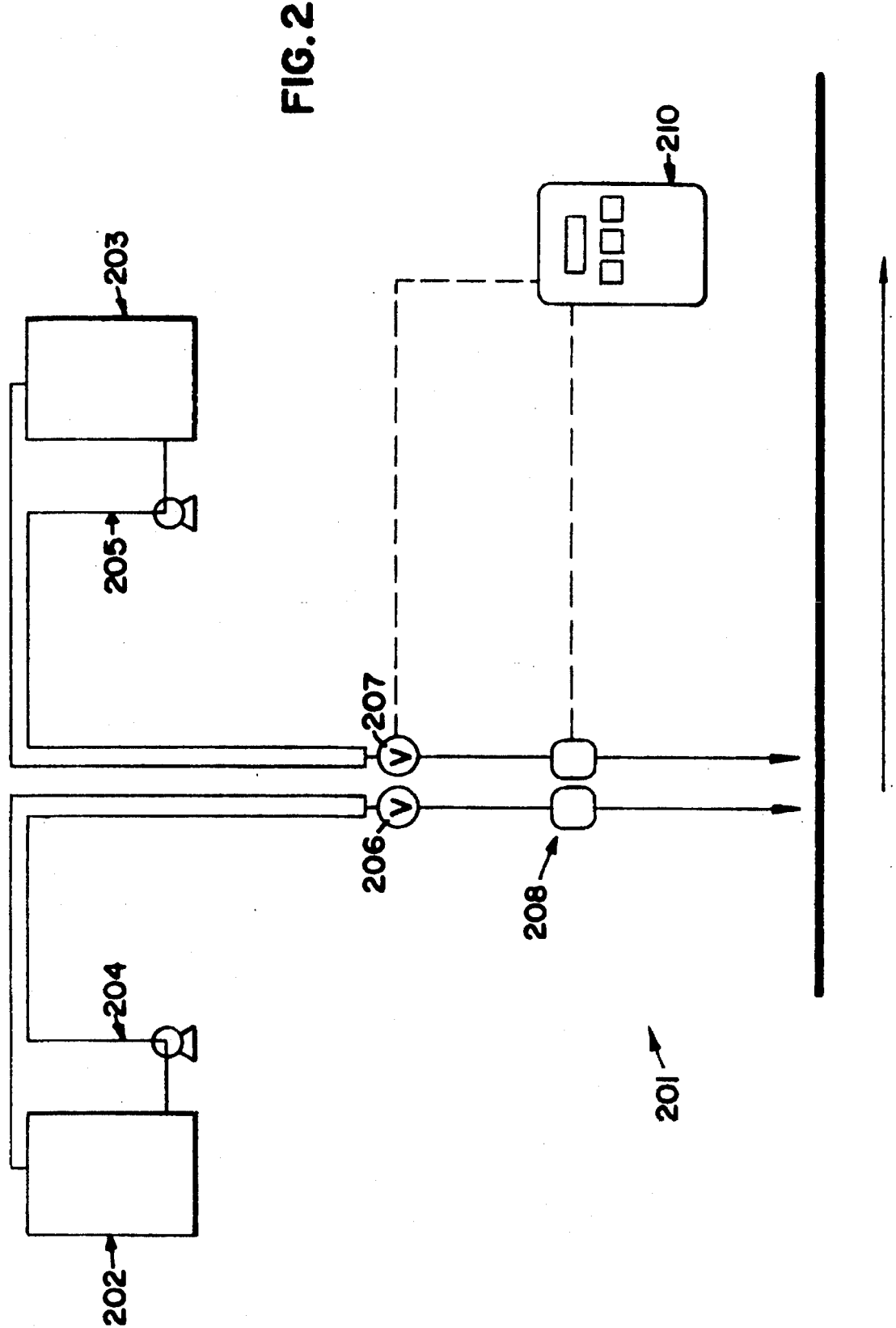
FIG. 2 is a schematic drawing of a continuous manufacturing process that can be utilized to practice the method of the invention.

In a continuous process embodiment 201 of the invention, shown in FIG. 2, the liquid sodium phosphate and the liquid sodium hydroxide are delivered in continuous loops 204 and 205 from the storage tanks 202 and 203 to three way valves 206 and 207. The liquid sodium hydroxide and the liquid sodium phosphate are simultaneously delivered into the continuous process cheese through a metering system 208 that controls the amount of each material that is added.

By varying the amount of the source of alkalinity, preferably, sodium hydroxide which is added to the liquid sodium phosphate, the final pH of the process cheese can be adjusted. The pH of the process cheese is important because pH can affect the cheese protein configuration and stability in addition to the ability of the sodium phosphates to bind calcium. Generally, the pH of a final process cheese is between about 5 to 6.5. A pH of about 5 is near the isoelectric point of the cheese proteins which can cause the process cheese to become crumbly. In contrast, when the pH of the final process cheese is about 6.5, the cheese can become very soft and elastic.

Furthermore, controlling the ratio of sodium hydroxide to liquid sodium phosphate determines the ratio of monosodium phosphate, disodium phosphate, and trisodium phosphate in the liquid phosphate composition. By controlling the amount of sodium hydroxide which is contacted with a specific amount of the liquid sodium phosphate, a predetermined ratio of monosodium phosphate, disodium phosphate and trisodium phosphate can be prepared in the liquid phosphate solution.

Figure 3:
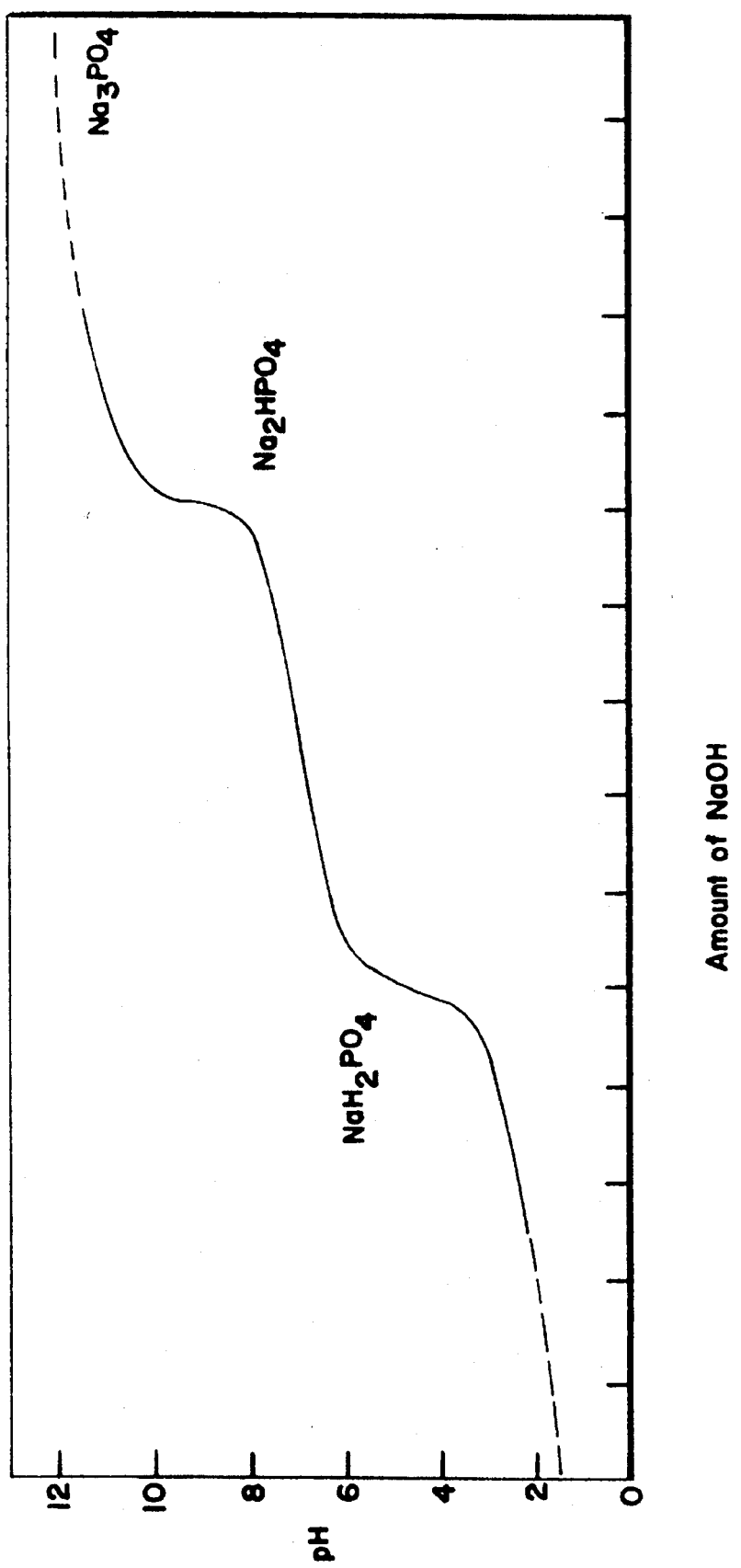
FIG. 3 is an illustration of a titration curve of phosphoric acid with sodium hydroxide.

This concept is demonstrated in the titration curve of phosphoric acid with sodium hydroxide shown in FIG. 3. In this system there are three steps with two inflexion points at pH's 4.5 and 9.5. The first inflexion at pH 4.5 corresponds to the formation of monosodium phosphate and the second inflexion at pH 9.5 corresponds to the formation of disodium phosphate.

Generally, the weight ratio of the liquid phosphate composition to the weight of base on an anhydrous basis is between about 1:2 and 4:1.

Tables 1 through 3 shown below, illustrate the method of the invention wherein by varying the amounts of sodium hydroxide and liquid sodium phosphate, a predetermined ratio of disodium phosphate and trisodium phosphate in the final food product can be achieved. In Tables 1 through 3 shown below, the liquid sodium phosphate comprises CHEESE-PHOS™ manufactured by Hawkins Chemical Inc., of Minneapolis, Minn. CHEES-PHOS™ has a pH of about 3.8 to 4.2 crystallization point less than 50° F. and about 44.5 to 45.5% by weight monosodium phosphate. The sodium hydroxide used in Tables 1 through 3 has a concentration of 50% by weight.

TABLE 1

| | | | (Sodium phosphates comprise about 1.75% by wt. of the process cheese) | | | | | |
|---|---|---|---|---|---|---|---|---|
| FORMULA | LIQUI-PHOS ™ (LBS.) | + | SODIUM HYDROXIDE (LBS.) | = | WATER (LBS.) | + | DISODIUM PHOSPHATE (LBS.) | + | TRISODIUM PHOSPHATE (LBS.) |
| 1 | 22.1 | | 6.7 | | 14 | | 14.75 | | — |
| 2 | 21.8 | | 7.6 | | 13 | | 12.75 | | 3.75 |
| 3 | 21.5 | | 8.5 | | 12 | | 10.75 | | 7.50 |
| 4 | 17.8 | | 6.9 | | 10 | | 9.0 | | 6.0 |
| 5 | 21.2 | | 9.4 | | 11 | | 8.75 | | 11.25 |
| 6 | 17.7 | | 7.8 | | 9 | | 7.25 | | 9.50 |
| 7 | 20.9 | | 10.2 | | 10 | | 6.75 | | 15.0 |
| 8 | 20.5 | | 11.0 | | 8 | | 4.75 | | 18.6 |
| 9 | 20.1 | | 11.8 | | 7 | | 2.75 | | 22.3 |
| 10 | 18.6 | | 12.3 | | 5 | | — | | 26.0 |

TABLE 2

| | | | (Sodium phosphates comprise about 2% by wt. of the process cheese) | | | | | |
|---|---|---|---|---|---|---|---|---|
| FORMULA | LIQUI-PHOS ™ (LBS.) | + | SODIUM HYDROXIDE (LBS.) | = | WATER (LBS.) | + | DISODIUM PHOSPHATE (LBS.) | + | TRISODIUM PHOSPHATE (LBS.) |
| 11 | 24.7 | | 7.4 | | 16 | | 16.5 | | — |
| 12 | 23.9 | | 9.5 | | 13 | | 11.75 | | 8.75 |
| 13 | 23.5 | | 10.5 | | 12 | | 9.50 | | 13.0 |
| 14 | 22.3 | | 11.0 | | 10 | | 7.0 | | 16.5 |
| 15 | 22.7 | | 12.5 | | 9 | | 4.75 | | 21.75 |
| 16 | 22.0 | | 13.2 | | 8 | | 2.25 | | 26.0 |
| 17 | 21.9 | | 14.4 | | 6 | | — | | 30.5 |

TABLE 3

| | | | (Sodium phosphates comprise about 2.2% by wt. of the process cheese) | | | | | |
|---|---|---|---|---|---|---|---|---|
| FORMULA | LIQUI-PHOS ™ (LBS.) | + | SODIUM HYDROXIDE (LBS.) | = | WATER (LBS.) | + | DISODIUM PHOSPHATE (LBS.) | + | TRISODIUM PHOSPHATE (LBS.) |
| 18 | 28.5 | | 8.5 | | 18 | | 19.0 | | — |

TABLE 3-continued (Sodium phosphates comprise about 2.2% by wt. of the process cheese)

| FORMULA | LIQUI-PHOS ™ (LBS.) | + | SODIUM HYDROXIDE (LBS.) | = | WATER (LBS.) | + | DISODIUM PHOSPHATE (LBS.) | + | TRISODIUM PHOSPHATE (LBS.) |
|---|---|---|---|---|---|---|---|---|---|
| 19 | 27.3 | | 8.5 | | 17 | | 17.5 | | 1.5 |
| 20 | 27.1 | | 8.9 | | 16 | | 16.5 | | 3.25 |
| 21 | 27.3 | | 9.6 | | 16 | | 15.75 | | 5.25 |
| 22 | 27.1 | | 10.0 | | 16 | | 14.75 | | 7.0 |
| 23 | 27.0 | | 10.5 | | 15 | | 13.75 | | 9.0 |
| 24 | 26.2 | | 10.7 | | 14 | | 12.25 | | 11.0 |
| 25 | 26.0 | | 11.2 | | 13 | | 11.0 | | 13.25 |
| 26 | 26.7 | | 12.0 | | 13 | | 10.5 | | 15.25 |
| 27 | 26.1 | | 12.1 | | 13 | | 9.5 | | 16.5 |
| 28 | 26.3 | | 12.8 | | 12 | | 8.5 | | 19.0 |
| 29 | 15.9 | | 7.9 | | 7 | | 5.0 | | 11.75 |

It will be appreciated by those skilled in the art that variations can be made in the invention without departing from the spirit and scope of the invention as defined by the claims.

What is claimed is:

1. A method of preparing processed dairy, poultry and cereal products comprising the steps of:
   (a) contacting a liquid sodium phosphate, wherein the liquid sodium phosphate is stored at a temperature between about 40° to 100° F., has a crystallization temperature less than about 115° F., has an acidic pH less than about 6.5, and has a greater concentration of monosodium phosphate than disodium phosphate, with an effective amount of sodium hydroxide to give a liquid phosphate composition wherein the weight ratio of the liquid phosphate composition to the weight of sodium hydroxide on an anhydrous basis is between about 1:2 and 4:1, and
   (b) combining a dairy, poultry or cereal product precursor with the liquid phosphate composition.

2. The method of claim 1 wherein a total combined weight on an anhydrous basis of monosodium phosphate, disodium phosphate and trisodium phosphate in a resulting dairy product is less than about 3%.

3. The method of claim 1 wherein the method comprises a batch system.

4. The method of claim 1 wherein the method comprises a continuous system.

5. (Amended) A method of using liquid trisodium phosphate to reduce salmonella in processing poultry comprising the steps of:
   (a) contacting a liquid sodium phosphate, wherein the liquid sodium phosphate is stored at a temperature between about 40° to 100° F., has a crystallization temperature less than about 115° F., has an acidic pH less than about 6.5, and has a greater concentration of monosodium phosphate than disodium phosphate, with an effective amount of sodium hydroxide to give a liquid trisodium phosphate composition wherein the weight ratio of the liquid phosphate composition to the weight of sodium hydroxide on an anhydrous basis is between about 1:2 and 4:1, and
   (b) combining a poultry product precursor with the liquid trisodium phosphate composition.

6. A method of using liquid trisodium phosphate in cereal production comprising the steps of:
   (a) contacting a liquid sodium phosphate, wherein the liquid sodium phosphate is stored at a temperature between about 40° to 100° F., has a crystallization temperature less than about 115° F., has an acidic pH less than about 6.5, and has a greater concentration of monosodium phosphate than disodium phosphate, with an effective amount of sodium hydroxide to give a liquid trisodium phosphate composition wherein the weight ratio of the liquid phosphate composition to the weight of sodium hydroxide on an anhydrous basis is between about 1:2 and 4:1, and
   (b) combining a cereal product precursor with the liquid trisodium phosphate composition.

* * * * *

UNITED STATES PATENT AND TRADEMARK OFFICE
CERTIFICATE OF CORRECTION

PATENT NO. : 5,458,909

DATED : October 17, 1995

INVENTOR(S) : John R. Sevenich

It is certified that error appears in the above-identified patent and that said Letters Patent is hereby corrected as shown below:

On column 5, lines 43 and 44, please delete "homogenous" and substitute therefore --homogeneous--

On column 9, line 48 (claim 5), please delete "(Amended)" after the fig. "5."

Signed and Sealed this

Twenty-seventh Day of February, 1996

Attest:

BRUCE LEHMAN

*Attesting Officer*     Commissioner of Patents and Trademarks